United States Patent [19]

Higgins

[11] 4,017,328
[45] Apr. 12, 1977

[54] LEAD CHROMATE PIGMENT WITH IMPROVED THERMAL STABILITY

[75] Inventor: James Francis Higgins, Livingston, N.J.

[73] Assignee: E. I. Du Pont de Nemours and Company, Wilmington, Del.

[22] Filed: Mar. 24, 1975

[21] Appl. No.: 561,436

[52] U.S. Cl. .......................... 106/298; 106/308 B
[51] Int. Cl.² ...................... C09C 1/20; C09C 1/20
[58] Field of Search ...................... 106/298, 308 B; 427/215

[56] References Cited

UNITED STATES PATENTS

| | | | |
|---|---|---|---|
| 2,023,928 | 12/1935 | Lederle et al. | 106/298 |
| 2,030,009 | 2/1936 | Lederle | 106/298 |
| 2,063,254 | 12/1936 | Lederle | 106/298 |
| 2,365,171 | 12/1944 | Botti | 106/298 |
| 3,370,971 | 2/1968 | Linton | 106/298 |
| 3,639,133 | 2/1972 | Linton | 106/298 |
| 3,798,045 | 3/1974 | Jackson | 106/298 |

*Primary Examiner* — Winston A. Douglas
*Assistant Examiner* — William G. Wright

[57] ABSTRACT

Lead chromate pigment treated with from 0.2 to 1% of silica. The silica-treated lead chromate pigments, when coated with dense, amorphous silica, are particularly useful for coloring high temperature molding plastics.

11 Claims, No Drawings

4,017,328

LEAD CHROMATE PIGMENT WITH IMPROVED THERMAL STABILITY

BACKGROUND OF THE INVENTION

The term "lead chromate pigment" as used herein refers to the pigments identified as Chrome Yellow CI-77600 Lead Sulfochromate CI-77603, and Molybdate Orange CI-77605 in the "Colour Index", second edition, 1956, published jointly by the Society of Dyers and Colourists, England, and the American Association of Textile Chemists and Colorists, United States. The yellow lead chromate pigments include a very green shade "Primrose Yellow" in rhombic crystal form, a relatively pure lead chromate in monoclinic crystal form commonly known as "Medium Yellow" and solid solutions of lead chromate and lead sulfate in monoclinic form known as "Light Yellows." The molybdate oranges vary in color from a relatively light masstone, strong and yellow tint (small particle size) to a dark, red masstone and weak, red tint (relatively large particle size).

Lead chromate pigments have been prepared by a variety of methods, most of which involve precipitation of the lead chromate pigment from aqueous solutions of its constituent ions, i.e., lead, chromate, sulfate and for molybdate oranges, molybdate, in amounts varying according to the shade of pigment desired. Conventionally, an aqueous solution containing the soluble anionic salts is mixed with a lead salt, in the form of an aqueous slurry or an aqueous solution, depending on the solubility of the lead salt. After precipitation, but prior to isolation, the lead chromate pigment is commonly treated with a variety of hydrous oxides among which are hydrous oxides of aluminum, titanium, manganese, silicon, antimony and bismuth or mixtures thereof to provide a loose porous coating on the surface of the pigment to enhance pigmentary properties, such as light-fastness in paint compositions, as described, for example, in U.S. Pat. Nos. 2,212,917 2,808,339, and 2,813,039. The red shade molybdate orange pigments are conventionally further treated with an antimony compound, commonly antimony trichloride, prior to isolation.

The major contribution toward color of lead chromate pigment resides in the lead chromate component. Likewise, many of their shortcomings are also attributable to the properties inherent in the lead chromate component. Among these are (1) sensitivity to alkalies and acids, (2) staining in the presence of sulfides and (3) darkening on exposure to light or to elevated temperatures.

Early attempts to overcome these deficiencies have usually involved special treatment of the pigments designed either to provide a means of neutralizing the attacking agent and rendering it temporarily ineffective or to provide a barrier against the ready access thereof to the sensitive pigment particle. The claimed improvements, although very frequently demonstrable, have usually been only of academic interest in that their effectiveness has been short lived and not of sufficient duration to render possible the use of these pigments in many applications, particularly those applications where a high degree of thermal stability is required.

More recent and relatively successful attempts to overcome these deficiencies are described, for example, in U.S. Pat. Nos. 3,370,971 and 3,639,133. These patents describe coated lead chromate pigments, which are chemically resistant, lightfast and relatively thermally stable. The pigments therein described are prepared by applying a coating of dense, amorphous silica and optionally alumina to lead chromate pigment which has been precipitated and after-treated with hydrous oxide in a conventional manner. The dense silica-coated lead chromate pigments are described generally as resistant to darkening when heated to 300° to 320° C. in such plastics as polyethylene or polystyrene. A dense silica-coated molybdate orange pigment is described in Example 1 of U.S. Pat. No. 3,370,391 as exhibiting no significant discoloration up to about 250° C. and minor discoloration up to 315° C. in a thermoplastic resin, compared to a conventional molybdate orange which darkens noticeably at 230° C. A dense silica-coated Medium Chrome yellow is described in Example 7 of that patent as showing only small color loss at 288° C. as compared to a conventional medium chrome yellow.

Although the dense silica-coated lead chromate pigments do show significant improvement in thermal stability when compared with uncoated pigment and gel-coated pigment known in the art, the resistance to darkening exhibited by these pigments at 300°–320° C. is low enough under many processing conditions to necessitate the use of temperatures from 30°–60° C. lower than the stated range to insure adequate color integrity. The resistance to darkening is further decreased in proportion to the length of time the pigment is exposed to elevated temperatures. For example, a pigment which retains color integrity when initially reaching an elevated temperature can darken considerably after being maintained at that temperature for several minutes.

The need to avoid elevated temperatures and extended exposure to elevated temperatures has a particularly adverse impact on the thermoplastics industry. In the thermoplastics industry pigmented thermoplastics are often held at the extrusion temperature for as long as 30 minutes prior to extrusion, during which time the pigment can significantly darken. In addition, the speed of further processing depends primarily on high temperature of the thermoplastic. In the processing of thermoplastics the use of temperatures even 30° C. below 300° C., not to mention 60° C. below, can decrease polymer flow and increase residence time of the polymer in the mold to the extent that process efficiency suffers and overall productivity decreases.

This invention provides for silica-treated lead chromate pigment which, when coated with dense, amorphous silica, retains a significantly higher degree of color integrity at high temperatures than conventional dense silica-coated lead chromate pigments, while retaining and, in some cases surpassing, the degree of chemical resistance and lightfastness exhibited by the conventional lead chromate pigments.

SUMMARY OF THE INVENTION

According to the invention there is provided an improvement in a process for preparing lead chromate pigment in an aqueous medium by contacting an aqueous solution containing a soluble salt of chromate and, optionally, at least one soluble salt selected from the group consisting of sulfate and molybdate with aqueous lead salt to form an aqueous slurry of said precipitated pigment and applying at least one hydrous metal oxide to the precipitated pigment. The improvement resides in adding from 0.2 to 1% by weight, and preferably from 0.3 to 0.5% by weight, of a silicate compound, calculated as $SiO_2$ and based on the weight of the final base pigment, to the aqueous solution prior to the precipitation of the lead chromate pigment, i.e., prior to contacting the aqueous solution with an aqueous lead salt. The phrase "final base pigment" as used herein refers to the silica-treated lead chromate pigment with at least one hydrous metal oxide applied thereto. The silicate compound utilized in this process is desirably an inorganic silicate of at least moderate solubility in water, such as alkali metal silicates.

The lead chromate pigments of the invention contain at least one hydrous metal oxide applied to the outer surface of the precipitated pigment and from 0.2 to 1.0% by weight of silica, calculated as $SiO_2$ and based on the weight of the final base pigment. The amount of hydrous metal oxide applied after precipitation of the pigment is not critical to the practice of this invention, but total amounts from 0.5 to 6.0% by weight, calculated as metal oxide and based on the weight of the final base pigment, are preferred to provide an effective hydrous metal oxide coating which is not unnecessarily thick.

The silica-treated lead chromate pigment of the invention is particularly useful as base pigment to which a coating of dense, amorphous silica and, optionally, alumina is applied according to procedures well-known in the art, e.g., U.S. Pat. No. 3,370,971. Although the pigments of the invention generally show at least comparable physical and chemical properties relative to untreated lead chromate pigments, the improvement in chemical resistance and especially in thermal stability is exhibited only when the pigments of the invention are coated with dense, amorphous silica. Compared to conventional lead chromate pigments coated with dense, amorphous silica, the silica-treated lead chromate pigments of the invention when coated with dense, amorphous silica show a marked improvement in color integrity at temperatures as high as 320° C.

DETAILED DESCRIPTION OF THE INVENTION

The aqueous medium from which lead chromate pigment is precipitated should contain a salt of chromate and, optionally, at least one salt of sulfate and molybdate which are at least moderately soluble and preferably highly soluble in aqueous solution. The relative proportions of the salts used depend on the shade of lead chromate pigment desired and are well-known to those skilled in the art. For example, a medium yellow shade usually requires from 97 to 100% lead chromate and a primrose shade usually requires from 40 to 85% by weight of lead chromate and 15 to 60% by weight of lead sulfate. For reasons of high solubility, economy and availability alkali metal salts, particularly sodium salts, of chromate, sulfate and molybdate are preferred. Aqueous lead salt is commonly mixed with the aqueous medium in the form of an aqueous slurry or aqueous solution depending on the solubility of the lead salt or salts used. A commonly used insoluble lead salt is lead carbonate, often prepared just prior to reaction with chromate, sulfate and molybdate by adding sodium carbonate to an aqueous solution of lead nitrate. Among the soluble lead salts useful in forming lead chromate pigment are lead nitrate and lead acetate.

Because of the extremely low solubility of lead chromate pigment in aqueous media, the pigment precipitates very rapidly from a solution of its constituent ions. Therefore, to have maximum control of the precipitation reaction, it is desirable to mix an aqueous solution of chromate and, optionally, at least one of sulfate and molybdate with a separate aqueous solution or slurry of lead salt. In the preparation of lead chromate pigment of the medium yellow type, the total chromate should be added to the aqueous medium in two parts. That is, a first aqueous solution containing the desired amount of silicate and sulfate and from about 70% to 95% of the predetermined amount of chromate is first contacted with an aqueous solution of lead salt to initially precipitate the pigment, then, a solution containing the remaining chromate is added to the pigment slurry. For all precipitations it is preferred that the mixing be done under conditions which promote rapid intimate contact of the salt solutions.

The silicate compound utilized in the process of the invention can be added to the aqueous medium in which the pigment is prepared in the form of an aqueous solution of the silicate compound. A variety of silicate compounds are useful in this process, e.g., alkali metal silicates. The major criterion for the silicate compound is at least moderate water-solubility. It is essential that the silicate compound be added to the aqueous medium via the aqueous solution containing the predetermined proportions of chromate, sulfate, and molybdate prior to precipitation of the pigment. This procedure is not to be confused with conventional after-treatments with silica or other hydrous oxides which involve the application of hydrous oxide to the pigment by addition of hydrolyzable salts of hydrous oxides to the aqueous medium after precipitation of the pigment.

After addition of the silicate compound followed by precipitation of the pigment, it is essential that the pigment receive the conventional after-treatments with at least one hydrous metal oxide and preferably at least two hydrous metal oxides in order to achieve improved properties in the final pigment. No significant improvement in the properties of lead chromate pigment is observed when the silicate compound is employed alone, i.e., without application of at least one hydrous metal oxide after precipitation of the silica-treated pigment. Among the hydrous metal oxides useful in the practice of the invention are hydrous metal oxides of aluminum, titanium, manganese, silicon, tin, hafnium, thorium, columbium, tantalum, antimony, bismuth and mixtures thereof. When more than one hydrous metal oxide is applied to the pigment it is preferred that hydrous aluminum oxide be one of the hydrous metal oxides chosen to insure the most significant improvement in the properties of the silica-treated pigment. The second oxide of choice preferred for use with hydrous aluminum oxide is hydrous titanium oxide for lead chromate pigment of the chrome yellow type and hydrous silicon dioxide for those of the molybdate orange type.

The total amount of hydrous metal oxide or oxides applied after precipitation of the pigment is preferably from 0.5 to 6.0% by weight, calculated as metal oxide and based on the weight of the final base pigment. For silica-treated lead chromate pigment of the yellow types, i.e., light and medium, it is preferred that the pigment contain from 1.0 to 2.0% by weight of hydrous titanium oxide and from 1.0 to 2.0% by weight of hydrous aluminum oxide, in addition to 0.2 to 1%, and preferably 0.3 to 0.5%, by weight of silica. For silica-treated lead chromate pigment of the molybdate orange type, it is preferred that the pigment contain from 1.0 to 1.5% of hydrous aluminum oxide and from 1 to 5% hydrous antimony oxide in addition to the silica. For silica-treated lead chromate pigment of the primrose type, it is preferred that the pigment contain from 1 to 2% by weight of hydrous aluminum oxide and from 1 to 2% of hydrous manganous oxide in addition to the silica.

It is not clear, at this time, exactly how the silicate compound effects the improvements in hydrous metal oxide coated chrome yellow pigment. Although the role of the silicate compound in the compositions of the invention is not fully understood, it apparently facilitates the application of porous hydrous oxide to the lead chromate pigment, which when coated with dense, amorphous silica exhibits much improved thermal stability.

In any event, the after-treatment with hydrous metal oxide which follows precipitation of the lead chromate pigment can be applied in the conventional manner well-known to those skilled in the art, e.g., U.S. Pat. Nos. 2,212,917 and 2,808,339. The hydrous metal oxides can be applied to the pigment by adding water-soluble inorganic metal salts capable of forming the corresponding hydrous metal oxides in water to the aqueous slurry of pigment. Among the water-soluble inorganic metal salts used are metal halides such as aluminum chloride and hydrated metal sulfate such as hydrated aluminum sulfate, titanyl sulfate and manganese sulfate.

As stated hereinabove, the improvement in the thermal stability of the lead chromate pigment of the invention is achieved when a coating of dense, amorphous silica and, optionally, alumina is applied to the final base pigment. The commonly used, practical procedures for applying a dense silica coating to a pigment involve using pigment which has been isolated from the aqueous slurry in which it was precipitated. The isolation procedure conventionally involves filtration, washing and, optionally, drying. For the silica-treated pigment prepared according to the invention, isolation prior to dense silica coating is preferred to achieve pigment having the highest thermal stability. The dense silica coating is preferably applied to the final base pigment in an amount from 2 to 40% by weight, based on the total weight of the dense silicacoated pigment, by a variety of conventional methods, such as described in U.S. Pat. Nos. 3,370,971 and 3,639,133.

In one method a dilute sodium silicate solution (about 3% by weight of $SiO_2$) is passed through a bed of cation exchange resin in the hydrogen form of sufficient capacity so that all of the sodium ion is removed to give a silicic acid effluent with a pH of 2.9–3.3. Such a solution is only moderately stable, but will keep for several hours without gelation if maintained at a low temperature (close to 0° C.). A suitable amount of such a silicic acid solution is then added slowly (3–5 hours) to the alkaline pigment slurry at 90–95° C. while maintaining the pH in the range of 9.0–9.5 by the periodic addition of increments of a dilute alkali such as NaOH solution. Obviously, the exact method of maintaining the pH in the desired range is not important and it could be done by maintaining the presence of a suitable buffer. Such a method would be subject, however, to the limitations imposed by the presence of sodium ion or other metallic ions, and the simple periodic addition of a suitable alkali has many points in its favor.

In another method equivalent amounts of a dilute sodium silicate solution (5.7% $SiO_2$) and a dilute sulfuric acid solution (3.18% $H_2SO_4$) are added simultaneously to the hot (±95° C.) alkaline pigment slurry over a substantial period of time (3–5 hours) while maintaining the pH in the range of 9.0–10.0 by periodic addition of small amounts of dilute alkali (NaOH solution for instance). This is the preferred method of operation, and the variations mentioned earlier may easily be applied thereto. Thus, the pH may be allowed to go below 9.0, perhaps as low as 6.0 or 7.0, without completely destroying the desired effect; nevertheless, the results are better in the higher range. The reaction time can be reduced to as little as one hour without serious detriment. Although the temperature of reaction may be as low as about 60° C., this causes some tendency toward the formation of free $SiO_2$ in gel form; hence it is highly desirable to keep the temperature above at least 75° C. the exact concentrations of the solutions used are not important except that they should be relatively dilute and the amounts used should be essentially chemically equivalent.

A third method for applying a dense, amorphous silica coating to pigment involves adding all of the sodium silicate solution to the pigment slurry previously made alkaline, as with $NH_4OH$. This gives a pH of about 11.0, near the maximum permissible and, after heating the mixture to about 75° C., a 5% sulfuric acid solution is added slowly (1 to 1.5 hours) to give a final pH of about 7.8 to 8.0. An additional heating period up to about one hour is desirable in this procedure. The concentrations used and time of addition are not critical.

In each of these methods, the dense silica-coated product can be highly dispersed and difficult to filter with a considerable tendency for yield loss during the filtration and a tendency to result in hard products on drying. It is preferable, therefore, that a flocculation step be introduced. Such a step, although not necessary to the preparation of pigment of the desired characteristics, offers many advantages such as improved ease of filtration and washing, elimination of yield losses during filtration and improved texture of the resulting pigment. A variety of methods known in the art, such as those described in U.S. Pat. No. 3,370,971 are useful in isolating the dense silicacoated pigment of this invention. A preferred method for facilitating isolation of the product is to add a polyvalent metal salt, especially an aluminum salt such as sodium aluminate, in aqueous solution, to the slurry of dense silica-coated pigment prior to isolation.

To overcome any fragility which may be exhibited by the encapsulating coatings discussed above, the coated pigment may, if desired, be treated with an alkaline earth metal salt of an acid selected from the group consisting of resin acids and long-chain fatty acids according to the procedure described in U.S. Pat. No. 3,470,007. This aftertreatment may render the coatings less susceptible to destruction under severely abrasive conditions of subsequent processing in plastics applications.

These methods of forming the dense amorphous silica layer on the surface of the lead chromate pigment particles have some feature in common, viz. that the silica is added as "active silica". When sodium silicate is acidified, silicic acid is formed, probably initially as orthosilicic acid, $Si(OH)_4$. However, this product tends to polymerize the reaction of two silanol groups

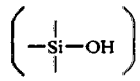

to form a siloxane group

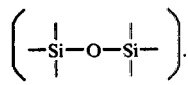

Under acidic conditions, this polymerization proceeds rapidly until a predominant proportion of the silanol groups present have been used up in the formation of siloxane bonds. The polymer thus formed has a high molecular weight and is defined as "inactive". Under the conditions of moderate alkalinity used in the examples below, there is a low degree of polymerization wherein the condensation between silanol groups has proceeded to only a limited extent leaving the silica in an "active"form which readily deposits on the surface of the pigment particles present. It is not intended to imply that there is no polymerization nor that the process of polymerization is completely inhibited but, under the conditions specified, the silica is in a state of low polymerization and, thus active, for a sufficient time to bring about deposition in the dense, amorphous form on the surface of the pigment particles.

The quantity of silica to be applied in the pigment coating can vary over a considerable range depending on the intended end use of the pigment. For use in extruded hot thermoplastic resins from 15 to 32% by weight of silica is desirable, and amounts up to about 40% by weight can be used without adversely affecting pigment color. In applications where extremely high thermal stability is not required, amounts of silica as low as 2% by weight provide improved chemical resistance and lightfastness. Thus, for purposes of this invention the dense, amorphous silica coating can be in the range of about 2 to 40% by weight of the final dense silica-coated pigment. When alumina is also present the quantity of $Al_2O_3$ can be varied from 0.25 to 2% by weight of the final pigment.

PREFERRED EMBODIMENTS

In one embodiment of the invention, silica-treated lead chromate pigment of the light yellow type is prepared by contacting a first aqueous solution containing a mixture of dissolved sodium salts of chromate, sulfate and from 0.2 to 1%, preferably from 0.3 to 0.5% by weight of silicate, calculated as $SiO_2$, and based on the weight of the final base pigment at a pH from 11 to 13 with a second aqueous solution containing dissolved lead nitrate at a pH from 3 to 4 to precipitate the pigment. The resulting pigment slurry is stirred for several minutes at elevated temperature, e.g., 95° C. to facilitate crystal growth, commonly known as development. After development an aqueous solution of hydrated aluminum sulfate is added to the slurry. After a few minutes of stirring an aqueous solution of titanyl sulfate is added to the slurry. The pH of the slurry is adjusted to from about 5 to 6 and the silica-treated lead chromate pigment is isolated from the slurry by filtration, washed with water and dried.

In another embodiment of the invention, silica-treated lead chromate pigment of the medium yellow type is prepared by contacting a first aqueous solution containing a mixture of dissolved sodium salts of from 70 to 95% by weight of a predetermined amount of chromate, sulfate and silicate in the amount specified above with a second aqueous solution containing dissolved lead nitrate at a pH from 3 to 4. Immediately thereafter, an aqueous solution containing from 5 to 30% by weight of the predetermined amount of sodium chromate is added to the mixture. This two-part addition of chromate is thought to be necessary to insure the chromate excess needed to develop the crystal into the medium yellow size and color. In addition, it is thought that lead chromate is preferentially precipitated over lead silicate and the excess chromate is destroyed unless the silica is precipitated first. In any event, after precipitation, the resulting pigment slurry is held at elevated temperature, e.g., 95° C and held at that temperature for several minutes to facilitate crystal growth. Hydrous metal oxides of titanium and aluminum are applied as for the light yellow pigment, additional aqueous lead salt is added to insure complete reaction of any chromate which may be present, and the product is isolated in the conventional manner. The additional aqueous lead salt can be added to the pigment slurry before or after application of the hydrous metal oxide or oxides.

In another embodiment of the invention, silicatreated lead chromate pigment of the molybdate orange type is prepared by contacting a first aqueous solution containing a mixture of the dissolved sodium salts of chromate, sulfate, molybdate and silicate in the amount specified above at a pH from 7 to 9 with a second aqueous solution containing dissolved lead nitrate at a pH from 3 to 4 to precipitate the pigment. To facilitate crystal growth an aqueous solution of sodium chloride is added to the resulting pigment slurry and stirring is continued for several minutes. Then separate aqueous solutions of sodium silicate and hydrated aluminum sulfate, respectively, are added sequentially to the reaction slurry. The pH of the slurry is adjusted to from about 5.5 to 6.5 after which the pigment is isolated in the conventional manner.

The following examples are intended to illustrate the invention. The term "parts" as used herein refers to parts by weight. The physical and chemical properties of all exemplified pigments are determined according to the procedures described in Examples 1 to 2.

EXAMPLE 1

Silica-Treated Lead Chromate Pigment of the Light Yellow Type

Solution A is prepared by dissolving 441.64 parts of $Pb(No_3)_2$ in 2400 parts of water at a temperature of 80° F. (27° C.) and the pH is adjusted to 3.2. Solution B is prepared by dissolving 139.15 parts of $Na_2Cr_2O_7 \cdot 2H_2O$, 27.8 parts of $Na_2SO_4$, 3.07 parts of $NaHF_2$ and 4.92 parts of sodium silicate (29.5% of $SiO_2$, $SiO_2/Na_2O$ = 3.25, such as Du Pont Technical Grade No. 9) in 1520 parts of water and the pH is adjusted to 12.1–12.3 at a temperature of 80°F. (27° C.).

To precipitate the pigment, Solution B is added to Solution A over a period of about 40 seconds with agitation. The resulting slurry is heated to 165° F. (74° C.) in 3 minutes. Then the slurry is rapidly heated to 205° F. (96° C.) and maintained at that temperature for 10 minutes. Then an aqueous solution containing 30.5 parts of hydrated aluminum sulfate (equivalent to 56.1% $Al_2(SO_4)_2$ or 17.1% of $Al_2O_3$) is added to the slurry. After the slurry is stirred for 5 minutes, an aqueous solution of titanyl sulfate in an amount equivalent of 6.49 parts of titanium dioxide is added to the slurry with stirring. Ten seconds after the addition of titanyl sulfate is complete the slurry is neutralized with an aqueous solution of sodium carbonate. The resulting brilliant lead chromate pigment of light yellow shade is isolated from the slurry in the conventional manner by filtration, washing and drying. The product is analyzed and found to contain 0.31% by weight of $SiO_2$, based on the weight of the final base pigment.

For purposes of comparative testing, a conventional lead chromate pigment of the light yellow type is prepared in the identical manner, except for the omission of the sodium silicate in Solution B.

When the silica-treated light yellow pigment and the conventional light yellow pigment are separately dispersed in a conventional alkyd coating composition vehicle and panels coated with the resulting composition are exposed to light, a similar degree of lightfastness is observed. When similar panels are exposed to a 10% aqueous solutio of sodium hydroxide and a 1% aqueous solution of sodium sulfide, respectively, the silica-treated light yellow pigment and the conventional light yellow pigment exhibit comparable resistance to spotting and color loss.

EXAMPLE 2

Dense Silica-Coated Lead Chromate Pigment of the Light Yellow Type

A paste is prepared by mixing 150 parts of the silica-treated pigment prepared according to the procedure of Example 1, 20 parts of the sodium silicate described in Example 1 and 447 parts of water. The mixture is further diluted with 790 parts of water for a total of about 1237 parts of water. The pH of the resulting slurry is then adjusted to 11.5 with a 5% aqueous solution of sodium hydroxide and the resulting pigment slurry is heated to 90° C.

In separate containers the following solutions are prepared:
1. 115 parts of the above-described sodium silicate is added to 530 parts of water,
2. 17.3 parts of 96.0% sulfuric acid is added to 800 parts of water.

These solutions are then added simultaneously to the pigment slurry prepared above over a period of three hours for solution (1) and 3–¾ hours for solution (2), while maintaining the temperature at 90–95° C. throughout the addition. After completion of the addition of solutions (1) and (2), an aqueous solution containing 10.0 parts of aluminum sulfate in 100 parts of water is added to the slurry. The slurry is stirred for 5 minutes and the pH is adjusted to 4.0–4.2 with 5% aqueous solution of sodium hydroxide. The product is then filtered, washed with water to a resistance of 5,000 ohms and dried overnight at 220° F. (104° C.) to give a silica-coated lead chromate pigment of the light yellow type having superior properties.

When tested for lightfastness and chemical resistance in the manner described in Example 1, the dense silica-coated light yellow pigment treated with silica shows comparable lightfastness and chemical resistance relative to a conventional dense silica-coated light yellow pigment prepared in the identical manner, except for the omission of sodium silicate in Solution B.

To test for resistance to darkening in thermophasic at high temperatures, the dense silica-coated light yellow pigment treated with silica and the conventional dense silica-coated light yellow pigment are separately mixed with solid granular polystyrene and subjected to can rolling for ten minutes, according to the method described in U.S. Pat. No. 3,639,133, then two-roll milled (0.016 inch clearance) into sheets. The sheets are cut and placed in an extruder at temperatures ranging from 204° C. to about 320° C. Prior to extrusion, the hot polystyrene is maintained at temperature for 20 minutes. When the polystyrene is extruded, the polystyrene containing the dense silica-coated light yellow pigment treated with silica shows substantially no darkening at temperatures up to about 280° C. and only very slight darkening at 320° C. By comparison the polystyrene containing the conventional dense silica-coated light yellow pigment begins to darken at 278° C. and exhibits significant darkening at 320° C.

EXAMPLE 3

Silica-Treated Lead Chromate Pigment of the Medium Yellow Type

Solution A is prepared by dissolving 331.0 parts of $Pb(NO_3)_2$ in 1790 parts of water at 80° F. (27° C.) and the pH is adjusted to 3.3. Solution B is prepared by dissolving 145.5 parts of $Na_2Cr_2 \cdot 7.2H_2O$, 4.1 parts of $Na_2SO_4$, 0.385 parts of $NaHF_2$, and 5.25 parts of the sodium silicate described in Example 1 in 1790 parts of water at 80° F. (27° C.). Solution C is prepared by dissolving 4.5 parts of $Na_2Cr_2O_7 \cdot 2H_2O$ in 100 parts of water.

Solution A is added to Solution B over a period of 40 seconds. Immediately thereafter Solution C is added to Solution B. The slurry is heated to 180° F. (82° C.) and maintained at that temperature for 20 minutes. Then an aqueous solution containing 48.0 parts of the hydrated aluminum sulfate described in Example 1 is added to the slurry. After one minute of stirring an aqueous solution of titanyl sulfate in an amount equivalent to 6.8 parts of titanium dioxide is added to the slurry. The slurry is stirred for 10 seconds after which an aqueous solution containing 34.0 parts of $Pb(NO_3)_2$ is added to the slurry. The pH of the slurry is then adjusted to 5.6 with $Na_2CO_3$. The resulting brilliant lead chromate pigment of medium yellow shade is isolated in the conventional manner by filtration, washing and drying. The product is analyzed and found to contain 0.41% by weight of $SiO_2$, based on the weight of the final base pigment.

The color and lightfastness of this medium yellow pigment are similar to those of a conventional medium yellow pigment, prepared in the identical manner except for the omission of the sodium silicate in Solution B. The chemical resistance of this medium yellow pigment is similar to that of the conventional medium yellow pigment comparably tested.

EXAMPLE 4

Dense Silica-Coated lead Chromate Pigment of the Medium Yellow Type

The procedure of Example 2 is followed except that 150 parts of the silica-treated medium yellow pigment of Example 3 is used.

The color and lightfastness of this dense silica-coated medium yellow pigment are similar to those of a conventional dense silica-coated medium yellow pigment prepared in an identical manner except for the omission of the sodium silicate in Solution B. Chemical resistance and thermal stability of this dense silica-coated pigment are superior to those of the conventional dense silica-coated medium yellow pigment comparably tested.

EXAMPLE 5

Silica-Treated Lead Chromate Pigment of the Molybdate Orange Type

Solution A is prepared by dissolving 386.2 parts of $Pb(NO_3)_2$ in 3160 parts of water and the pH is adjusted to 3.0–3.1 at a temperature of 67°–69° F. (19°–21° C.). Solution B is prepared by dissolving 139.5 parts $Na_2Cr_2O_7\cdot2H_2O$, 22.4 parts of $Na_2MoO_4$, 6.1 parts of $Na_2Cr_{SO}4$ and 9.85 parts of the sodium silicate described in Example 1, in 3103 parts of water, and the pH is adjusted to 7.4–7.6 at a temperature of 67°–69° F.). (19°–21° C.).

To precipitate the pigment, Solution B is introduced under the surface of Solution A over a period of 17–19 minutes with agitation. Chloride ion concentration is adjusted to develop tint and strength in the conventional manner by adding 57.0 parts of NaCl, after which the slurry is stirred for 15 minutes. To neutralize the slurry an aqueous solution containing 11.4 parts of $Na_2CO_3$ is then added to the slurry. Porous silica is then applied to the pigment by adding 18.3 parts of sodium silicate described in Example 1 and stirring for 3 minutes. Then an aqueous solution containing 28.5 parts of hydrated aluminum sulfate described in Example 1 is added to the slurry. The slurry is then neutralized by adding an aqueous solution containing 19.0 parts of sodium carbonate. After a few minutes of additional stirring, 7.0 parts of antimony oxide dissolved in hydrochloric acid is added to the slurry, after which the pH of the slurry is adjusted to 5.8–6.0. The resulting brilliant dark red shade molybdate orange pigment is isolated from the slurry in the conventional manner by filtration, washing and drying. The product contains 2.15% by weight of $SiO_2$ (including 1.4% by weight of $SiO_2$ applied as an aftertreatment), based on the weight of the final base pigment.

The color of this product is a darker red shade orange than that of a conventional molybdate orange pigment prepared in an identical manner except for the omission of the sodium silicate in Solution B. The chemical resistance is comparable to that of the conventional molybdate orange pigment and the lightfastness is superior to that of the conventional molybdate orange pigment.

EXAMPLE 6

Dense Silica-Coated Lead Chromate Pigment of the Molybdate Orange Type

The procedure of Example 2 is followed except that 150 parts of the silica-treated molybdate orange pigment of Example 5 is used.

The color of the resulting dense silica-coated molybdate orange pigment has a darker red shade than that of a conventional dense silica-coated molybdate orange pigment, prepared in an identical manner except for the omission of the sodium silicate in Solution B. The chemical resistance and thermal stability of the resulting pigment are superior to those of the conventional dense silica-coated molybdate orange pigment comparably tested.

EXAMPLE 7

Silica-Treated Chrome Yellow Pigment of the Primrose Type

Solution A is prepared by dissolving 331.2 parts of $Pb(NO_3)_2$ in 2690 parts of water at 80° F. (27° C.) and the pH is adjusted to 4.1. An aqueous solution of 46.7 parts of $Na_2CO_3$ in 200 parts of water is added to solution A to form an aqueous slurry of lead carbonate.

Solution B is prepared by dissolving 91.9 parts of $Na_2Cr_2O_7\cdot2H_2O$, 10.7 parts of $Na_2SO_4$, 2.46 parts of $NaHF_2$, 3.97 parts of concentrated $H_2SO_4$, 12.0 parts of the hydrated aluminum sulfate described in Example 1, and 20 parts of sodium silicate (0.2% by weight, based on the weight of the final base pigment) in 2910 parts of water at 80° F. (27° C.). The pH of the solution is adjusted to 1.85 with a 5% by weight aqueous solution of nitric acid.

To precipitate the pigment, Solution B is added to the previously prepared aqueous slurry of lead carbonate over a period of 40 seconds and the resulting slurry is stirred for 5 minutes. At intervals of 30 seconds the following solutions are added to the resulting slurry:

10.3 parts of $Na_2SO_4$ in 100 parts of water.
10.96 parts of $Na_2CO_3$ in 100 parts of water.
4.1 parts of $Na_4P_2O_7$ in 200 parts of water. After addition of the above-described solution, the slurry is heated to 180° F. (82° C.) and maintained at that temperature for 15 minutes.

Then at intervals of 30 seconds the following solutions are added to the slurry:
2.08 parts of $MnSO_4$ in 100 parts of water.
48.1 parts of the hydrated aluminum sulfate described in Example 1 in 100 parts of water.
5.20 parts of $Na_4P_2O_7$ in 250 parts of water. The pH of the resulting slurry is adjusted to 5.0–5.1, after which the slurry is heated to 190° F. (88° C.) and maintained at that temperature for 20 minutes.

The resulting brilliant chrome yellow pigment of the primrose type is isolated and tested in the manner described in Example 1.

The color, lightfastness, and chemical resistance of this pigment are similar to those of a conventional primrose yellow pigment, prepared in an identical manner except for the omission of the sodium silicate in Solution B.

EXAMPLE 8

Dense Silica-Coated Chrome Yellow Pigment of the Primrose Type

The procedure of Example 2 is followed, except that 150 parts of the chrome yellow pigment of Example 7 is used.

The color and lightfastness of this dense silica-coated primrose yellow pigment are similar to those of a conventional dense silica-coated primrose yellow pigment prepared in an identical manner except for the omission of the sodium silicate in Solution B. The chemical resistance and thermal stability of this dense silica-coated primrose yellow pigment are superior to those of the conventional dense silica-coated primrose yellow pigment comparably tested.

I claim:

1. In a process for preparing lead chromate pigment in aqueous medium by contacting an aqueous solution containing a soluble salt of chromate and, optionally, at least one soluble salt selected from the group consisting of sulfate and molybdate with aqueous lead salt whereby an aqueous slurry of said pigment is formed and applying at least one hydrous metal oxide to the pigment of the aqueous slurry pigment.

wherein the improvement comprises adding from 0.2 to 1% by weight of a soluble silicate compound, calculated as $SiO_2$ and based on the weight of the final base pigment, to said aqueous solution prior to precipitation of said pigment.

2. Process for preparing lead chromate pigment according to claim 1 wherein a coating of dense, amorphous silica is applied to said lead chromate pigment in an amount from 2 to 40% by weight, calculated as $SiO_2$ and based on the weight of the final base pigment.

3. Process for preparing lead chromate pigment according to claim 1 wherein from 0.3 to 0.5% by weight of said soluble silicate compound is added to said aqueous solution prior to precipitation of said pigment.

4. Process for preparing lead chromate pigment according to claim 1 wherein said soluble silicate compound is an alkali metal silicate.

5. Process for preparing lad chromate pigment according to claim 1 wherein said hydrous metal oxide is at least one hydrous oxide selected from the group consisting of the hydrous oxide of aluminum, titanium, manganese, silicon, tin, hafnium, thorium, columbium, tantalum, antimony and bismuth.

6. Process for preparing lead chromate pigment according to claim 5 wherein the total amount of hydrous metal oxide present is applied in an amount from 0.5 to 6.0% by weight, calculated as metal oxide and based on the weight of the final base pigment.

7. Process for preparing lead chromate pigment according to claim 6 wherein at least one hydrous oxide is aluminum hydrous oxide.

8. Process for preparing lead chromate pigment according to claim 7 wherein a coating of dense, amorphous silica is applied to said lead chromate pigment in an amount from 2 to 40% by weight, calculated as $SiO_2$ and based on the weight of the final base pigment.

9. Process for preparing lead chromate pigment of th medium yellow type according to claim 1 wherein said aqueous solution contains sulfate, silicate, and from 70 to 95% by weight of a predetermined amount of chromate and comprising the additional steps of adding a second aqueous solution containing from 5 to 30% by weight of the predetermined amount of chromate to said aqueous slurry prior to applying at least one hydrous metal oxide to said precipitated pigment, and ii. adding a third aqueous solution containing additional soluble lead salt to said aqueous slurry.

10. Process for preparing lead chromate pigment of the medium yellow type according to claim 7 wherein hydrous metal oxides of titanium and aluminum are applied to said precipitated pigment.

11. Process for preparing lead chromate pigment of the medium yellow type according to claim 10 wherein a coating of dense, amorphous silica is applied to said lead chromate pigment in an amount from 2 to 40% by weight.

* * * * *